United States Patent [19]
Nishida et al.

[11] Patent Number: 5,852,702
[45] Date of Patent: Dec. 22, 1998

[54] THIN FILM OPTICAL WAVEGUIDE AND OPTICAL DEFLECTING DEVICE

[75] Inventors: Naoki Nishida, Osaka; Tsuyoshi Iwamoto, Kyoto; Shunichi Hayamizu, Amagasaki, all of Japan

[73] Assignee: Minolta Co., Ltd., Osaka, Japan

[21] Appl. No.: 804,689

[22] Filed: Feb. 25, 1997

[30] Foreign Application Priority Data

Feb. 28, 1996 [JP] Japan ................................ 8-040962
May 13, 1996 [JP] Japan ................................ 8-117710

[51] Int. Cl.$^6$ ........................................ G02B 6/10
[52] U.S. Cl. .............................. 385/130; 385/37; 385/7; 385/10; 385/131
[58] Field of Search ............................ 385/8, 9, 10, 129, 385/130, 131, 132

[56] References Cited

U.S. PATENT DOCUMENTS 4,941,722  7/1990  Hatori .......................................... 385/7
5,689,362  11/1997  Kadota .......................................... 385/7

FOREIGN PATENT DOCUMENTS 60-124111  7/1985  Japan .

*Primary Examiner*—Hung N. Ngo
*Attorney, Agent, or Firm*—Burns, Doane, Swecker & Mathis, LLP

[57] ABSTRACT

A thin film waveguide and an optical deflecting device which have a substrate and a waveguide layer. An optical buffer layer which has a refractive index smaller than that of the waveguide layer is provided between the substrate and the waveguide layer, and the optical buffer layer has such a thickness as to make a zero mode guided light beam progressing in the waveguide layer have a propagation loss not more than 2 dB/cm and as to make a first mode guided light beam progressing in the waveguide layer have a propagation loss not less than 4 dB/cm. For example, the waveguide layer is a ZnO thin film, the substrate is a silicon substrate, and the optical buffer layer is a $SiO_2$ thin film. Further, an interdigital transducer is provided on the waveguide layer to excite Sezawa waves as surface acoustic waves. For example, the waveguide layer is designed to have a thickness which meets the following condition: $1.0 < hK < 5.0$ ($K = 2\pi/\Lambda$), wherein, h is the thickness of the waveguide layer, and $\Lambda$ is the wavelengths of the Sezawa waves. Furthermore, a conductor film is provided opposite the interdigital transducer with the waveguide layer in-between.

20 Claims, 11 Drawing Sheets

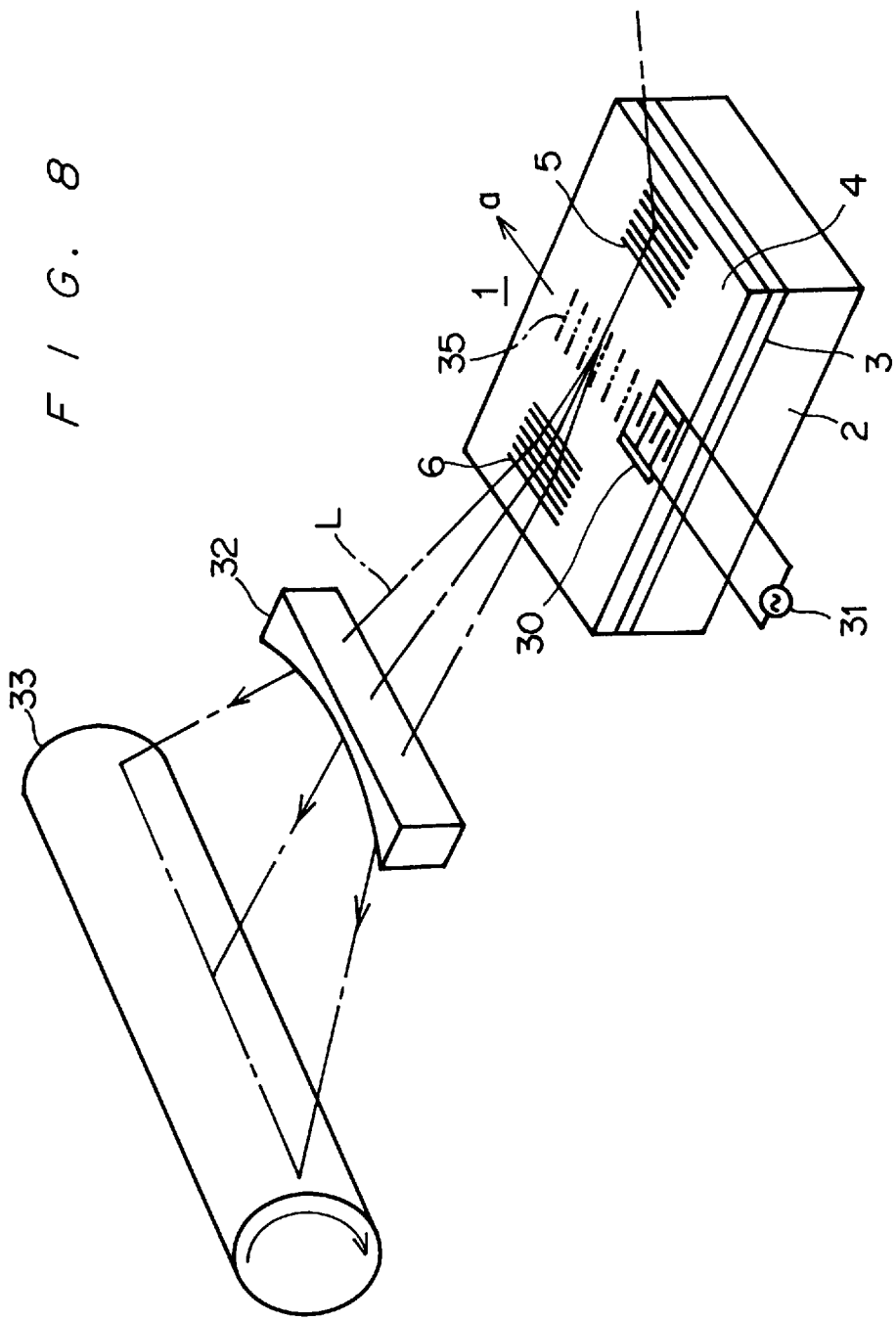
F I G. 8

F I G. 9
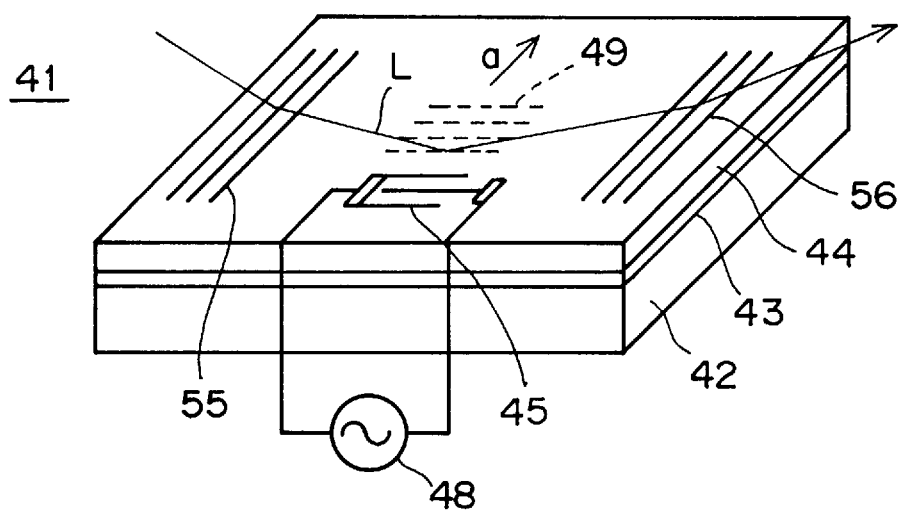
F I G. 10
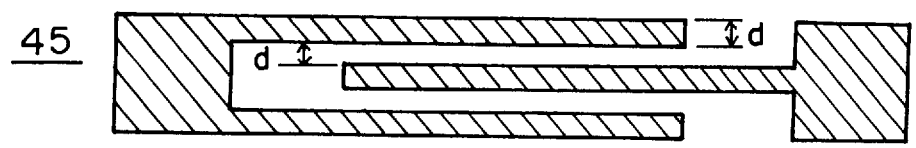

THIN FILM OPTICAL WAVEGUIDE AND OPTICAL DEFLECTING DEVICE

BACKGROUND OF THE INVENTION

1. Field of the Invention

The present invention relates to a thin film optical waveguide and an optical deflecting device, and more particularly to a thin film optical waveguide and an optical deflecting device which are used for an optical switch and an optical modulator of an optical computer, an optical branching filter, an optical modulator of an optical communication apparatus, and an optical deflector and an optical modulator of a laser beam printer, a copying machine, a scanner, etc.

2. Description of Related Art

A thin film optical waveguide which has a thin film type waveguide layer on a substrate with an optical buffer layer in-between has been well known. A light beam progressing in the waveguide layer (which will be hereinafter referred to as guided light beam) is diffracted by an emergence grating or an emergence prism provided on the waveguide layer and is made emergent from the waveguide layer as an output light beam. Also, an incidence grating or an incidence prism provided on the waveguide layer makes an input light beam incident to the waveguide layer.

In such a conventional thin film optical waveguide, by setting the incident angle of the input light beam to a specified angle, a guided light beam of a zero mode is excited. It is desired that the guided light beam progressing in the waveguide layer is emergent therefrom as a zero mode light beam. However, because of diffusion on interfaces of the waveguide layer, the mode of the guided light beam is partly changed from the zero mode to higher modes. Consequently, there is a problem that the higher mode light beams are outputted as unnecessary light beams together with the regular zero mode light beam.

Also, various types of optical deflecting devices using a well-known fact that a light beam progressing in a waveguide layer is deflected by acousto-optic interaction with surface acoustic waves propagated in the waveguide layer (Bragg diffraction) have been suggested. Such a conventional optical deflecting device comprises a substrate, a waveguide layer made of a piezoelectric material, a transducer for generating surface acoustic waves, light incidence means for making a light beam incident to the waveguide layer, and light emergence means for making the light beam progressing in the waveguide layer emergent therefrom. By varying the frequency of high-frequency electric power applied to the transducer, the wavelengths of the surface acoustic waves can be varied, and thus, the deflection angle of the guided light beam is controlled at a high speed and with a high accuracy.

However, in such a conventional optical deflecting device, since the surface acoustic waves are Rayleigh waves, the electromechanical coupling coefficient $k^2$ of the piezoelectric waveguide layer is small, and the efficiency of energy conversion from electric energy into mechanical energy is bad. Rayleigh waves are surface acoustic waves which are propagated concentrating energy on a surface of a semi-infinite medium. An electromechanical coupling coefficient $k^2$ is to indicate the efficiency of conversion of an electric input Ui provided to a transducer into a mechanical output Ua when the transducer is located on a piezoelectric thin film formed on a non-piezoelectric substrate. The electromechanical coupling coefficient $k^2$ is expressed as follows.

$$k^2 = Ua/Ui$$

Especially with respect to surface acoustic waves, the electromechanical coupling coefficient $k^2$ is expressed as follows.

$$k^2 = \Delta v/v = 2(v_f - v_m)/v_f$$

$v_m$: propagation speed of surface acoustic waves when the surface of the piezoelectric thin film is covered with a conductor $v_f$: propagation speed of surface acoustic waves when the surface of the piezoelectric thin film is not covered with a conductor For example, in a deflecting device which has a ZnO thin film acting as a waveguide layer on a fused quarts substrate and an interdigital transducer on the ZnO thin film, when Rayleigh waves are used as surface acoustic waves, the electromechanical coupling coefficient $k^2$ is at most about 0.012, which is unsatisfactory. Accordingly, the efficiency of the diffraction of the guided light beam caused by acousto-optic interaction with the surface acoustic waves is bad. Therefore, in order to obtain desired surface acoustic wave energy, the high-frequency electric power applied to the transducer must be enlarged. Thereby, the amount of heat generation of the transducer increases, and the refractive index of the waveguide layer changes with the heat.

When a guided light beam is incident to the wavefront of a surface acoustic wave at an angle θ (Bragg angle) which meets the following condition (1), Bragg diffraction is caused, and the guided light beam is deflected.

$$\theta = \sin^{-1}(\lambda/2\Lambda) \tag{1}$$

λ: wavelength of the guided light beam

Λ: wavelength of the surface acoustic wave

If the refractive index of the waveguide layer changes from n to n' with heat of the transducer, the wavelength of the guided light beam changes from λ to λ'=(n/n')λ, and accordingly, the Bragg angle changes from θ to θ'=$\sin^{-1}$(λ'/2Λ). The diffraction efficiency (=intensity of diffracted light/intensity of incident light) is the best when a guided light beam intersects a surface acoustic wave at the Bragg angle, and the larger the difference between the actual incident angle of the guided light beam to the surface acoustic wave and the Bragg angle is, the worse the diffraction efficiency is. Thus, the generation of heat of the transducer changes the Bragg angle, thereby changing the deflection angle and lowering the diffraction efficiency. Consequently, the emergent angle of the emergent light beam from the optical deflecting device changes, and the intensity of the emergent light beam is lowered.

The generation of heat of the transducer also changes the propagation speed of the surface acoustic waves. A case wherein the transducer is a tilted finger chirp interdigital transducer and a high-frequency electric signal whose frequency f periodically varies is applied to the interdigital transducer to generate surface acoustic waves with wavelengths Λ is described as an example.

A chirp interdigital transducer is an interdigital transducer which has finger electrodes at gradually varying pitch. Because of the finger electrodes at varying pitch, surface acoustic waves with a wide frequency band can be excited. A tilted finger chirp interdigital transducer has finger electrodes which are tilted in accordance with the variations in pitch of the finger electrodes. When generation of surface acoustic waves with a specified wavelength is intended by using a chirp interdigital transducer, since the finger electrodes vary in pitch gradually, not only surface acoustic waves with the intended wavelength but also those with nearby wavelengths are generated with large energy. Then, by tilting the finger electrodes in accordance with the variations in pitch, the transducer generates surface acoustic waves whose wave fronts vary in angle in accordance with the wavelengths thereof, so that the guided light beam can cross the surface acoustic waves, which have the specified wavelength and nearby wavelengths, at the respective Bragg angles.

Back to the example, the propagation speed v of the surface acoustic waves is expressed as the following expression (2).

$$v = f\Lambda \tag{2}$$

When the propagation speed of the surface acoustic waves changes from v to v' with heat of the transducer, the frequency f is not influenced by the heat, and the wavelength of the surface acoustic waves changes from $\Lambda$ to $\Lambda'=(v'/v)\Lambda$ according to the expression (2). Therefore, according to the expression (1), the Bragg angle changes from $\theta_1$ to $\theta_1'=\sin^{-1}(\lambda/(2(v'/v)\Lambda))$. Thus, the generation of heat changes the Bragg angle, thereby changing the deflection angle and lowering the diffraction efficiency. Consequently, the emergent angle of the emergent light beam from the optical deflecting device changes, and the intensity of the emergent light beam is lowered.

As described above, when generation of heat of the transducer is significantly large, the stability of intensity of the emergent light beam and the accuracy of the emergent angle, which are the most important factors of the performance of the optical deflecting device, deteriorate remarkably.

Moreover, since a large amount of electric power is applied to the transducer, the durability of the transducer deteriorates. Further, applying a large amount of electric power generates a large electromagnetic wave therearound, which may cause malfunctions of circuits and devices around the optical deflecting device and affect human bodies. In order to prevent such damage to the peripheral things, the optical deflecting device must be shielded by a metal plate or the like. However, this increases the manufacture cost and the sizes of parts.

SUMMARY OF THE INVENTION

An object of the present invention is to provide a thin film optical waveguide and an optical deflecting device which keep output of a zero mode light beam while inhibiting output of higher mode light beams.

Further, another object of the present invention is to provide an optical deflecting device which attains a high diffraction efficiency from a small amount of electric power and deflects a guided light beam with a high accuracy.

In order to attain the objects, a thin film optical waveguide or an optical deflecting device according to the present invention has an optical buffer layer between a substrate and a waveguide layer, and the optical buffer layer has a refractive index smaller than that of the waveguide layer and has such a thickness as to make a zero mode guided light beam progressing in the waveguide layer not more than 2 dB/cm and as to make a first mode guided light beam progressing in the waveguide layer not less than 4 dB/cm. For example, the substrate is a silicon substrate, the waveguide layer is a ZnO thin film, and the optical buffer layer is a $SiO_2$ thin film.

With the arrangement, in the waveguide layer, guided light beams of first and higher modes are attenuated more efficiently than a guided light beam of a zero mode.

An optical deflecting device according to the present invention comprises a substrate, a piezoelectric waveguide layer on the substrate, light incidence means, light emergence means and generating means for generating Sezawa waves as surface acoustic waves. By using Sezawa waves which are the second mode of Rayleigh waves as surface acoustic waves, a high electromechanical coupling coefficient $k^2$ is attained. In the optical deflecting device, the generating means has an interdigital transducer composed of a pair of interdigital electrodes and a high-frequency electric power source which supplies an alternating voltage to the pair of interdigital electrodes, and further, a conductor is provided opposite the interdigital transducer with the piezoelectric waveguide layer in-between. In this structure, a higher electromechanical coupling coefficient $k^2$ can be attained.

BRIEF DESCRIPTION OF THE DRAWINGS

These and other objects and features of the present invention will be apparent from the following description with reference to the accompanying drawings, in which:

FIG. 8 is a schematic view of an optical printer in which the thin film optical waveguide shown by FIG. 1 is employed;

FIG. 9 is a perspective view of an optical deflecting device which is a second embodiment of the present invention;

FIG. 10 is a plan view of a transducer of the optical deflecting device shown by FIG. 9;

DETAILED DESCRIPTION OF THE EMBODIMENTS

Some embodiments of the present invention are described with reference to the accompanying drawings.

Figure 1:
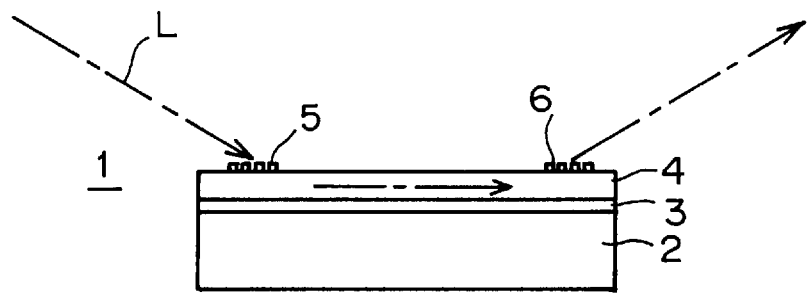
FIG. 1 is a front view of a thin film optical waveguide which is a first embodiment of the present invention.

FIG. 1 shows a thin film optical waveguide which is a first embodiment of the present invention. The thin film optical waveguide 1 which guides a light beam comprises a substrate 2, an optical buffer layer 3, a waveguide layer 4, an incidence grating 5 and an emergence grating 6. Silicon and other materials can be used as the substrate 2. In this embodiment, the substrate 2 is silicon.

The refractive index of the silicon substrate 2 is approximately 3.5, which is higher than that of the waveguide layer 4. (For example, if the waveguide layer 4 is a ZnO thin film, the refractive index is approximately 2.0.) Therefore, if the waveguide layer 4 is formed directly on the silicon substrate 2, the waveguide layer 4 will not act. This is because a guided light beam L progressing in the waveguide layer 4 leaks to the silicon substrate 2. In order to prevent the leakage, the optical buffer layer 3 which has a refractive index smaller than that of the waveguide layer 4 is provided. More specifically, the optical buffer layer 3 is a $SiO_2$ layer which has a refractive index of approximately 1.5 and is formed on the silicon substrate 2 by a thermal oxidation method. The optical buffer layer 3 can be formed by a sputtering method, a CVD method or the like.

On the optical buffer layer 3, the waveguide layer 4 is formed by, for example, a laser ablation method, a sputtering method, a vacuum evaporation method, a CVD method, a sol-gel method or the like. For example, chalcogenite, $LiNbO_3$, $LiTaO_3$, ZnO, $Nb_2O_3$, $Ta_2O_3$, $Si_3N_4$, YIG, etc. can be used as the material of the waveguide layer 4. Especially when the thin film waveguide 1 is used as a light deflecting element, a piezoelectric material such as ZnO, $LiNbO_3$ or the like is used. In this embodiment, the waveguide layer 4 is ZnO.

On the waveguide layer 4, the incidence grating 5 and the emergence grating 6 are provided in the left side and in the right side, respectively. The incidence grating 5 is to make a light beam L emitted from a light source couple to the waveguide layer 4. The emergence grating 6 is to make a light beam L progressing in the waveguide layer 4 emergent therefrom. Each of the gratings 5 and 6 has bars arranged at uniform intervals. The gratings 5 and 6 are made of the same material as the waveguide layer 4, and are formed by an electron beam scanning method, a photolithography method, a two-beam interference method or the like.

Figure 2:
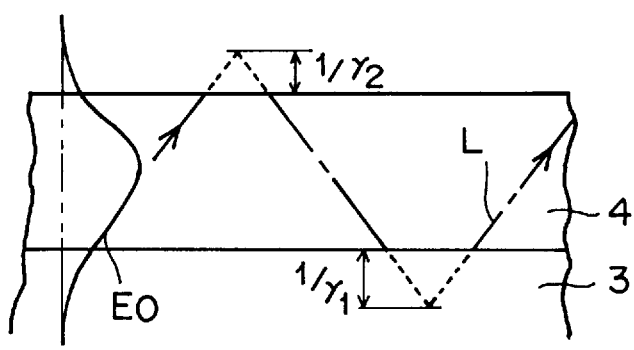
FIG. 2 is an illustration which shows a guided light beam progressing in a waveguide layer.

In the thin film optical waveguide 1 which has the above-described structure, a guided light beam L which is a TE zero mode, as shown in FIG. 2, has a distribution curve of electric field strength indicated by a curve EO and progresses zigzag in the waveguide layer 4 repeating total reflection on the upper and lower interfaces of the waveguide layer 4.

A TE (transverse electric) wave or a TE mode means a plane wave which does not have an electric component Ez in the propagation direction (z-direction). A TM (transverse magnetic) wave or a TM mode means a plane wave which does not have a magnetic component liz in the propagation direction (z-direction). Generally, the TM wave has a larger diffusion loss than the TE wave.

Generally, when a guided light beam is propagated in a step type two-dimensional waveguide whose refractive index varies step by step, the guided light beam is either the TE wave or the TM wave. In a perpendicular coordinate system composed of a propagation direction of the guided light beam (propagation axis) z, a direction of the thickness of the waveguide layer x and a direction of the surface of the waveguide layer y, the TE wave has components Ey, Hx and Hz, and the TM wave has components Ex, Hy and Ez.

The respective electric/magnetic components in the y-direction Ey and Hy of the TE wave and TM wave are constant, and the respective electric/magnetic components in the x-direction and z-direction Hx, Hz, Ex and Ez of the TE wave and TM wave are expressed by functions of x.

From solutions of these wave equations, eigenvalue equations are determined, and integrals 0, 1, 2, 3 . . . are set as the mode number m. A zero mode is the lowest mode. When the guided light beam progressing in the waveguide layer is a zero mode, the effective refractive index N is the largest, (that is, the reflection angle θ on the interfaces is the closest to 90 degrees,) and the propagation loss is the smallest. Further, when the mode number m is 1, it is referred to as a first mode, and when the mode number m is 2, it is referred to as a second mode. These modes are higher modes of the zero mode.

The guided light beam L leaks toward the substrate 2 by $1/\gamma_1$ and leaks into the air by $1/\gamma_2$. The leakage $1/\gamma_1$ is larger than the leakage $1/\gamma_2$, and there is a relationship expressed by the following expression (1). A leakage distance X is defined as a distance between the surface of a waveguide layer and a point where the electric component is attenuated to 1/e, and the leakage distance toward the substrate 2 is expressed as $x = -h_1 - 1/\gamma_1$ ($h_1$: thickness of the waveguide layer 4). The distance between the interface of the waveguide layer 4 with the buffer layer 3 and the point where the electric component is attenuated to 1/e is $1/\gamma_1$.

$$\gamma_1 = k(N^2 - n_s^2)^{1/2} \qquad (1)$$

k=2 π/λ

λ: wavelength of the guided light beam L

N: effective refractive index $n_s$: refractive index of the substrate 2

If the refractive index of the waveguide layer 4 is $n_f$ and if the incident angle of a guided light beam to an interface of the waveguide layer 4 from the inside is θ, the effective refractive index N is defined as $n_f \times \sin\theta$. If the refractive index of the substrate 2 is $n_s$ and if the critical angle is $\theta_s$, $\sin\theta_s = n_s/n_f$. When $\theta > \theta_s$, the guided light beam progresses in the waveguide layer 4 repeating total reflection on the interfaces.

The larger the leakage $1/\gamma_1$ is, the larger the propagation loss of the guided light beam L is, and the more the guided light beam L is attenuated. The higher mode the guided light beam L is, the smaller the effective refractive index N is.

Figure 3:
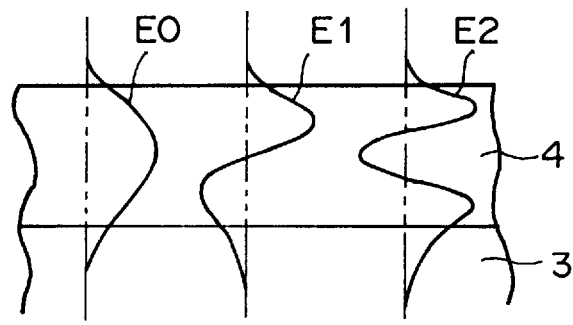
FIG. 3 is an illustration which shows respective distribution curves of electric field strength of guided light beams progressing in the waveguide layer.

Therefore, as shown in FIG. 3, the higher mode the guided light beam L is, the larger the leakage $1/\gamma_1$ is. In FIG. 3, the curve E1 is a distribution curve of electric field strength of a guided light beam which is a TE first mode, and the curve E2 is a distribution curve of electric field strength of a guided light beam which is a TE second mode. By designing the buffer layer 3 to have an optimal thickness, the propagation losses of guided light beams of higher modes become sufficiently large compared with that of a guided light beam of a zero mode. Therefore, even if guided light beams of higher modes are generated because of diffusion on the interfaces of the waveguide layer 4 or the like, the guided light beams of higher modes can be attenuated promptly.

Here, the design of the thickness of the buffer layer 3 is described.

In order to attenuate guided light beams of higher modes promptly while keeping a guided light beam of a zero mode, the thickness of the optical buffer layer 3 must be such a value as to make the propagation loss of a guided light beam of a zero mode not more than 2 dB/cm and as to make the propagation loss of a guided light beam of first mode not less than 4 dB/cm. As mentioned, the higher mode the guided light beam is, the larger the propagation loss is. Therefore, with respect to the propagation losses of guided light beams of higher modes, only the propagation loss of a first mode must be considered, and then, guided light beams of second and higher modes will be attenuated.

Figure 4:
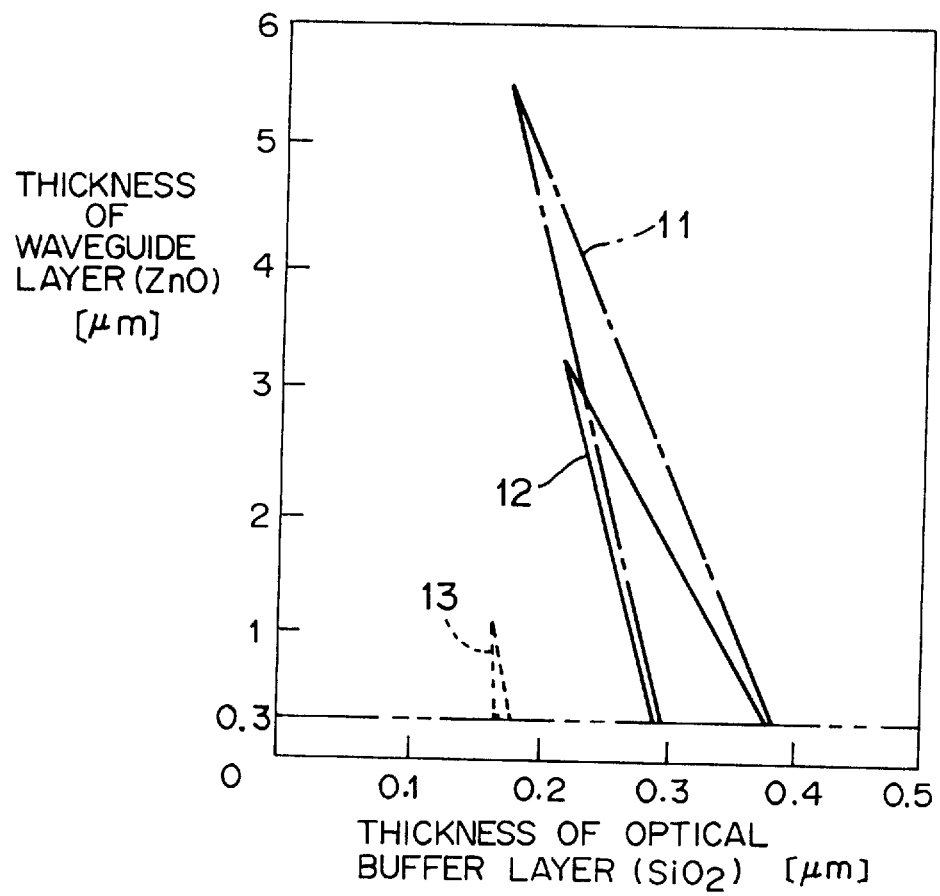
FIG. 4 is a graph which shows ranges of the optimal thickness of an optical buffer layer of the thin film optical waveguide.

FIG. 4 is a graph which shows ranges of the optimal thickness of the buffer layer 3 which meets the above-described condition, relating to the thickness of the waveguide layer 4. The optimal thickness of the buffer layer 3 also depends on the wavelength of the guided light beam L. In FIG. 4, the region enclosed by the alternate short and long dash line 11 shows a range of the optimal thickness of the buffer layer 3 when the wavelength of the guided light beam L is 780 nm (when the light source is a laser diode). When the waveguide layer 4 and the optical buffer layer 3 are ZnO and $SiO_2$ respectively, if the thickness of the waveguide layer 4 is $h_1$ $\mu$m, the optimal thickness $h_2$ $\mu$m of the optical buffer layer 3 is within a range which meets the following conditions.

$h_2 \leq -0.035h_1 + 0.3258 (\mu m)$ $h_2 \geq -0.050h_1 + 0.450 (\mu m)$ $h_1 \geq 0.300 (\mu m)$ The region enclosed by the solid line 12 shows a range of the optimal thickness of the buffer layer 3 when the wavelength of the guided light beam L is 633 nm (when the light source is a He—Ne laser). The optimal thickness $h_2$ $\mu$m of the buffer layer 3 is within a range which meets the following conditions.

$h_2 \leq -0.050h_1 + 0.450 (\mu m)$ $h_2 \geq -0.025h_1 + 0.275 (\mu m)$ $h_1 \geq 0.300 (\mu m)$ The region enclosed by the dotted line 13 shows a range of the optimal thickness of the buffer layer 3 when the wavelength of the guided light beam L is 400 nm. The optimal thickness $h_2$ $\mu$m of the buffer layer 3 is within a range which meets the following conditions.

$h_2 \leq -0.020h_1 + 0.18 (\mu m)$ $h_2 \geq -0.005h_1 + 0.17 (\mu m)$ $h_1 \geq 0.300 (\mu m)$ Further, when the waveguide layer 4 is less than 0.3 $\mu$m, light beams of first and higher modes are not excited on the waveguide layer 4, that is, the waveguide layer 4 acts as a waveguide only for a light beam of a single mode. Therefore, in this case, it is not necessary to control the thickness of the buffer layer 3.

Figure 5:
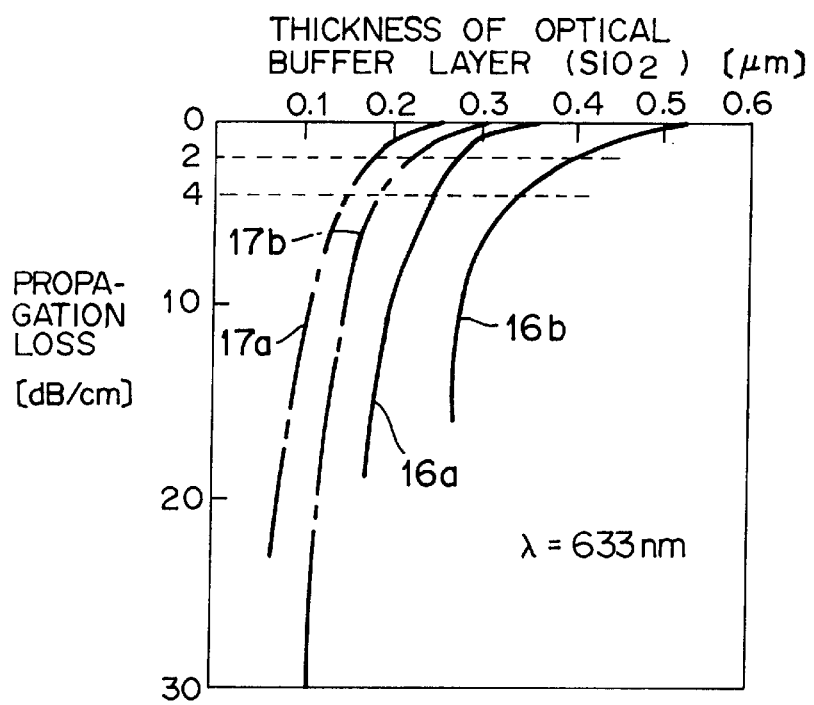
FIG. 5 is a graph which shows the propagation loss characteristic when a guided light beam with a wavelength of 633 nm progresses in the waveguide layer.

FIG. 5 shows the relationship between the thickness of the buffer layer 3 and the propagation loss of a guided light beam when the wavelength of the guided light beam is 633 nm. The solid lines 16a and 16b indicate the respective propagation losses of a guided light beam of a zero mode and a guided light beam of a first mode when the thickness of the waveguide layer 4 is 1 $\mu$m. The alternate short and dash lines 17a and 17b indicate the respective propagation losses of a guided light beam of a zero mode and a guided light beam of a first mode when the thickness of the waveguide layer 4 is 3 $\mu$m. For example, when the waveguide layer 4 is 1 $\mu$m, if the buffer layer 3 is designed to have a thickness of 0.3 $\mu$m, which is, as shown by the solid line 12 in FIG. 4, within the range of the optimal thickness, referring to the solid lines 16a and 16b in FIG. 5, the propagation loss of a guided light beam of a zero mode will be 0.79 dB/cm, and the propagation loss of a guided light beam of a first mode will be 6.29 dB/cm. Thus, in this case, the propagation losses of guided light beams of higher modes are sufficiently large compared with that of a guided light beam of a zero mode, and the guided light beams of higher modes can be attenuated promptly.

Figure 6:
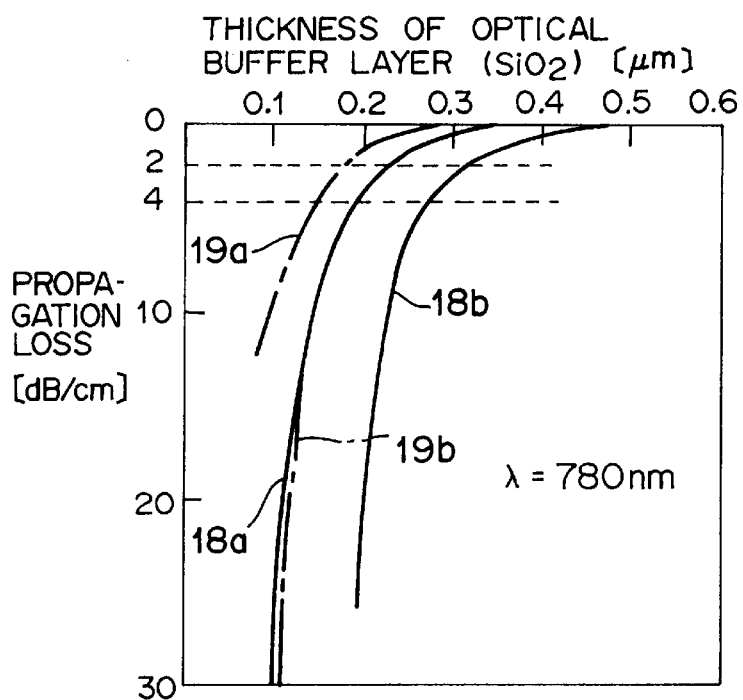
FIG. 6 is a graph which shows the propagation loss characteristic when a guided light beam with a wavelength of 780 nm progresses in the waveguide layer.

FIG. 6 shows the relationship between the thickness of the buffer layer 3 and the propagation loss of a guided light beam when the wavelength of the guided light beam is 780 nm. The solid lines 18a and 18b indicate the respective propagation losses of a guided light beam of a zero mode and a guided light beam of a first mode when the thickness of the waveguide layer 4 is 3 $\mu$m. The alternate short and dash lines 19a and 19b indicate the respective propagation losses of a guided light beam of a zero mode and a guided light beam of a first mode when the thickness of the waveguide layer 4 is 5 $\mu$m.

Figure 7:
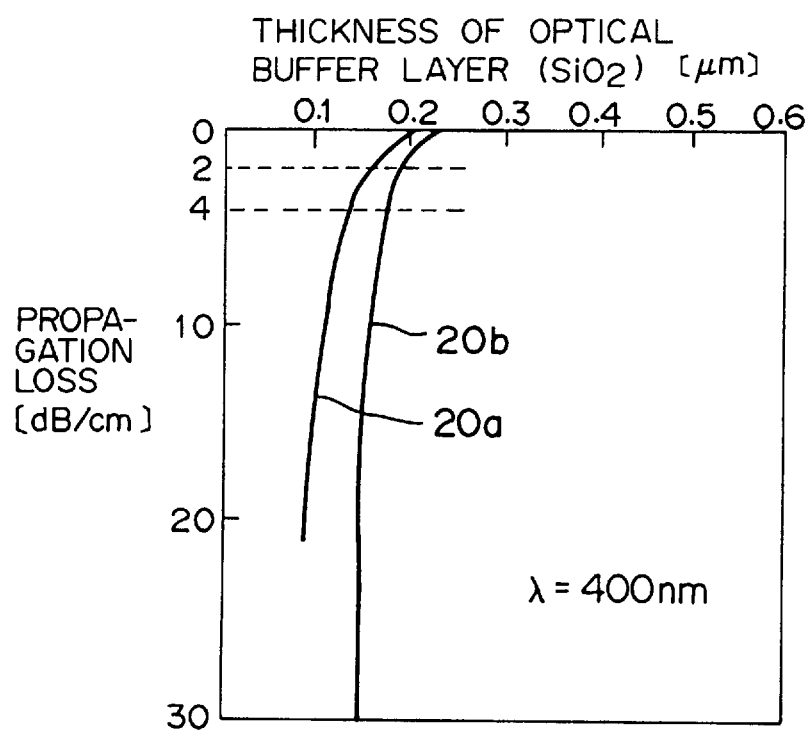
FIG. 7 is a graph which shows the propagation loss characteristic when a guided light beam with a wavelength of 400 nm progresses in the waveguide layer.

FIG. 7 shows the relationship between the thickness of the buffer layer 3 and the propagation loss of a guided light beam when the wavelength of the guided light beam is 400 nm. The solid lines 20a and 20b indicate the respective propagation losses of a guided light beam of a zero mode and a guided light beam of a first mode when the thickness of the waveguide layer 4 is 1 $\mu$m.

The following description is about the operation and effect of the thin film waveguide 1 when the waveguide 1 is used as an optical deflecting element in an optical printer which also comprises a lens system 32 and a photosensitive member 33 as shown in FIG. 8.

The thin film optical waveguide 1 is provided with an interdigital transducer 30 on the waveguide layer 4 in the central front side to be used as an optical deflecting element, and the interdigital transducer 30 is formed by a photolithography method, a lift-off method, an etching method or the like. The interdigital transducer 30 has a pair of interdigital electrodes. When a high-frequency signal generated by a high-frequency power source 31 is applied to the transducer 30, the transducer 30 excites surface acoustic waves 35 on the waveguide layer 4. As the high-frequency power source 31, for example, a VCO (voltage control oscillator) is used.

The surface acoustic waves 35 are propagated on the waveguide layer 4 in a direction indicated by arrow a in FIG. 8. A light beam L emitted from a light source is incident to the waveguide layer 4 via the incidence grating 5 and progresses in the waveguide layer 4 as a guided light beam of a zero mode. In the meantime, the mode of the guided light beam may be partly changed because of diffusion on the interfaces of the waveguide layer 4 or the like, thereby exciting light beams of higher modes. However, since the optical buffer layer 3 has such a thickness that the propagation loss of a guided light beam of a zero mode is not more than 2 dB/cm and that the propagation losses of light beams of first and higher modes are not less than 4 dB/cm, the light beams of higher modes are attenuated effectively and promptly, and output of light beams of higher modes can be inhibited.

The surface acoustic waves 35 cross the guided light beam L. If the surface acoustic waves 35 have gradually varying wavelengths, the guided light beam L is scanned. The time which it takes the surface acoustic waves 35 with varying wavelengths to cross the guided light beam L is the minimum time for one-line scanning. The guided light beam L deflected by the acousto-optic interaction with the surface acoustic waves 35 is emergent from the waveguide layer 4 via the emergence grating 5. Then, the light beam L passes through the lens system 32 and irradiates the photosensitive member 33. Here, the acousto-optic interaction is briefly described. Propagation of surface acoustic waves in a medium causes mechanical distortion inside the medium, and thereby, a change of the refractive index of the medium and a birefringement are caused (acousto-optic effect). Then, because of the change of the refractive index, a guided light beam progressing in the medium is diffracted. In this way, a quality image without image noise can be obtained. Thus, the thin film optical waveguide 1 can be used not only for an optical printer but also for a laser display, a head-mounted display, a scanning laser microscope and a writing/reading device of an optical memory.

FIG. 9 shows an optical deflecting device 41 which is a second embodiment of the present invention. The optical deflecting device 41 comprises a substrate 42, an optical buffer layer 43, a piezoelectric waveguide layer 44, an interdigital transducer 45, a high-frequency signal generator 48, an incidence grating coupler 55 and an emergence grating coupler 56.

As the substrate 42, a silicon substrate, a sapphire substrate or the like can be used. In this embodiment, the substrate 42 is a silicon substrate with a (001) surface.

The refractive index of the silicon substrate 42 is approximately 3.5, which is higher than that of the waveguide layer 44. (For example, if the waveguide layer 44 is a ZnO thin film, the refractive index is approximately 2.0.) Accordingly, if the waveguide layer 44 is formed directly on the silicon substrate 42, the waveguide layer 44 will not act because a guided light beam will leak from the waveguide layer 44 to the silicon substrate 42. Therefore, the optical buffer layer 43 which has a refractive index lower than that of the waveguide layer 44 is provided to shield a guided light beam L in the waveguide layer 44. In this embodiment, the optical buffer layer 3 is a $SiO_2$ thin film which has a refractive index of approximately 1.5.

Considering the relationship between the propagation loss of a guided light beam L progressing in the waveguide layer 44 and the thickness of the optical buffer layer 43, the propagation loss of the guided light beam L increases suddenly when the optical buffer layer 43 becomes thinner than a specified thickness. The specified thickness depends on the wavelength and the mode of the guided light beam L, the thickness of the waveguide layer 44, the refractive index of the substrate 42 and the refractive index of the optical buffer layer 43. For example, if the guided light beam L has a wavelength of 632.8 nm and is a $TM_o$ mode and if the waveguide layer 44 is a ZnO thin film with a thickness of 3.2 $\mu$m, in order to make the propagation loss of the guided light beam L, not more than 2 dB/cm, the thickness of the $SiO_2$ buffer layer 43 must be not less than 0.25 $\mu$m.

On the optical buffer layer 43, the waveguide layer 44 is formed. As the waveguide layer 44, a piezoelectric material such as ZnO is used. In this embodiment, the waveguide layer 44 is a ZnO thin film with a (0001) surface.

On the waveguide layer 44, the interdigital transducer 45 is provided in the central front side. The interdigital transducer 45 is made of Al or the like and formed by a photolithography method, a lift-off method, an etching method or the like. The interdigital transducer 45 is composed of a pair of interdigital electrodes. The interdigital transducer 45 is to convert a high-frequency signal generated by the high-frequency signal generator 48 into surface acoustic waves, that is, excite surface acoustic waves 49 on the waveguide layer 44. As shown in FIG. 10, the interdigital transducer 45 is a normal type, and each of the interdigital electrodes has finger electrodes which have the same width d and are arranged at uniform intervals d. This normal interdigital transducer 45 can excite surface acoustic waves with a wavelength of 4 d the most efficiently. FIG. 10 shows a case wherein the interdigital transducer has 1.5 pairs of finger electrodes.

On the waveguide layer 44, further, the incidence grating coupler 55 and the emergence grating coupler 56 are provided in the left side and in the right side respectively. The incidence grating coupler 55 is to make a light beam L emitted from a light source incident to the waveguide layer 44. The emergence grating coupler 56 is to make the guided light beam L progressing in the waveguide layer 44 emergent therefrom. Each of the grating couplers 55 and 56 has bars arranged at uniform intervals. The grating couplers 55 and 56 are made of, for example, the same material as the waveguide layer 44.

In the optical deflecting device 41 with the above-described structure, the surface acoustic waves 49 are propagated in the <110> direction of the silicon substrate 42, that is, in the direction indicated by arrow a in FIG. 9.

Generally, with respect to an optical deflector which comprises a silicon substrate, a ZnO thin film which has a thickness not less than a specified thickness and is provided on the silicon substrate, and an interdigital transducer provided on the ZnO thin film, when a high-frequency signal is applied to the interdigital transducer, Sezawa waves are excited. Rayleigh waves excited are too small to be regarded. By designing the ZnO thin film to have an optimal thickness, the electromechanical coupling coefficient $k^2$ of the ZnO thin film can be maximized. Sezawa waves are a mode of surface acoustic waves which are excited when a solid layer is provided on a surface of a semi-infinite medium. Surface acoustic waves excited in such cases are divided into three modes, namely, Rayleigh waves, Sezawa waves and Love waves. Sezawa waves are the second mode of Rayleigh waves. When a $LiNbO_3$ thin film, a ZnO thin film or the like is provided on a glass substrate, mainly Rayleigh waves are excited.

The ZnO thin film for the waveguide layer 44 is designed to have a thickness h of 3.2 $\mu$m so that Sezawa waves which are the second mode of Rayleigh waves can be excited. If the widths of the finger electrodes of the transducer 45 and the intervals among the finger electrodes are 2 $\mu$m so as to generate surface acoustic waves with a wavelength A of 8 $\mu$m, hK=2.5 (K=2 $\pi$/$\Lambda$). Tn this case, Sezawa waves which are the second mode of Rayleigh waves are propagated as surface acoustic waves, and the electromechanical coupling coefficient $k^2$ is the maximum value (approximately 0.04). The electromechanical coupling coefficient $k^2$ depends on the kind of the substrate 42, and the kind and the thickness of the waveguide layer 44.

Figure 11:
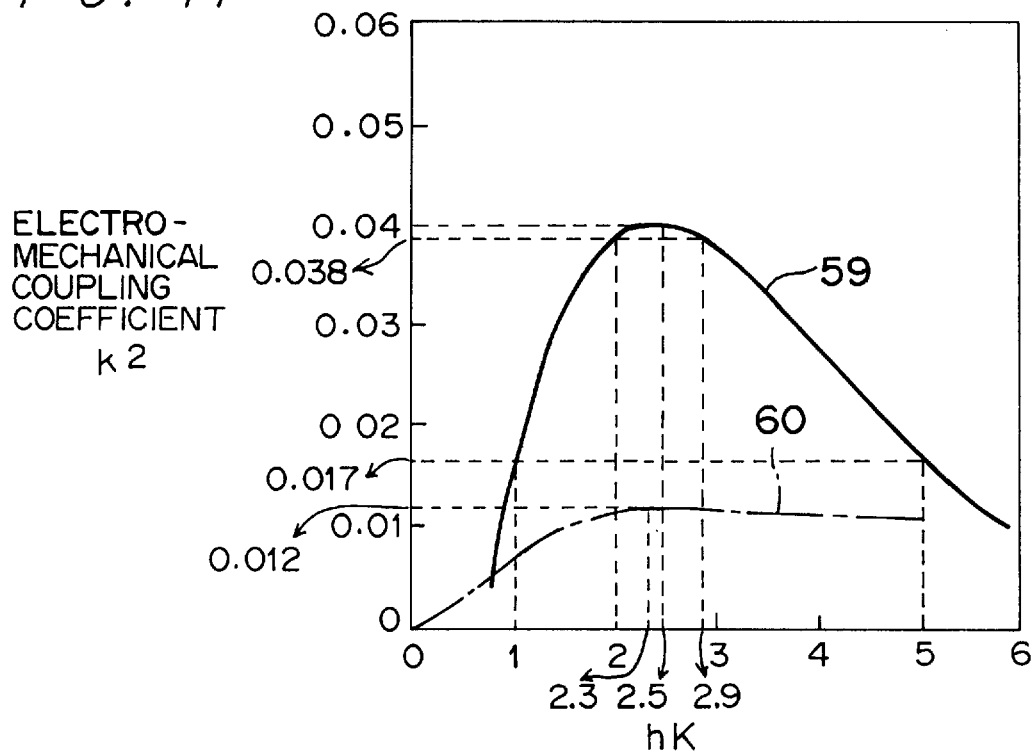
FIG. 11 is a graph which shows the relationship between the electromechanical coupling coefficient $k^2$ and the thickness of a ZnO thin film of the optical deflecting device shown by FIG. 9.

FIG. 11 is a graph showing the relationship between the electromechanical coupling coefficient $k^2$ and the thickness h of the ZnO thin film for the waveguide layer 44 (see the solid line 59). According to FIG. 11, the electromechanical coupling coefficient $k^2$ in generating Sezawa waves is not less than 0.017 when the thickness h of the ZnO thin film 44 meets the following condition.

$$1.0 < hK < 5.0$$

The electromechanical coupling coefficient $k^2$ in generating Sezawa waves is not less than 0.038 when the thickness h of the ZnO thin film 44 meets the following condition.

$$2.0 < hK < 2.9$$

Thus, by using Sezawa waves as the surface acoustic waves 49, the electromechanical coupling coefficient $k^2$ of the optical deflecting device 41 can be enlarged. In other words, the surface acoustic waves 49 can be excited with a high efficiency.

In FIG. 11, for comparison, the electromechanical coupling coefficient $k^2$ of a conventional optical deflecting device using Rayleigh waves is indicated by an alternate short and long dash line 60. The optical deflecting device comprises a fused quarts substrate, a ZnO thin film provided on the substrate as a waveguide layer and a normal interdigital transducer provided on the ZnO thin film. When a high-frequency electric signal is applied to the transducer, Rayleigh waves are excited as surface acoustic waves. For example, if the thickness of the ZnO thin film is 3 μm, and if the interdigital transducer has finger electrodes of which widths and intervals are 2 μm, hK=2.3, and the electromechanical coupling coefficient $k^2$ is the maximum (approximately 0.012). However, the maximum value is small compared with the electromechanical coupling coefficient $k^2$ in generating Sezawa waves. Thus, the optical deflecting device using Rayleigh waves is inefficient.

Figure 12:
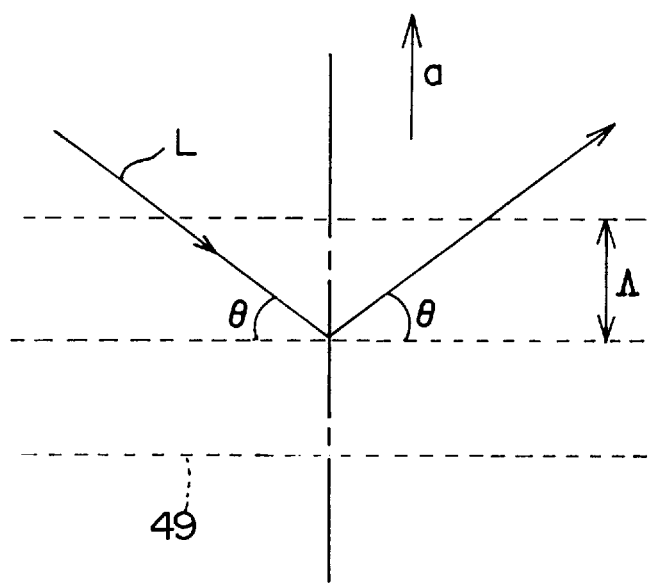
FIG. 12 is an illustration which shows Bragg diffraction.

Meanwhile, a light beam L emitted from a light source (not shown) is incident to the waveguide layer 44 via the incidence grating coupler 55 and progresses in the waveguide layer 44. As shown in FIG. 12, the guided light beam L intersects the surface acoustic waves 49 which are propagated in the direction of arrow a. The wavelengths of the surface acoustic waves 49 are Λ, and in FIG. 12, periodical wave fronts of the surface acoustic waves 49 are shown. When the guided light beam L intersects the surface acoustic waves 49 under the following condition, Bragg diffraction by an acousto-optic effect occurs, and the guided light beam L is diffracted and deflected.

$$\theta = \sin^{-1}(\lambda/2\Lambda)$$

θ: angle of intersection of the guided light beam L with the surface acoustic waves 49

λ: wavelength of the guided light beam L

Then, the deflected light beam L is emergent from the waveguide layer 44 via the emergence grating coupler 56.

Figure 13:
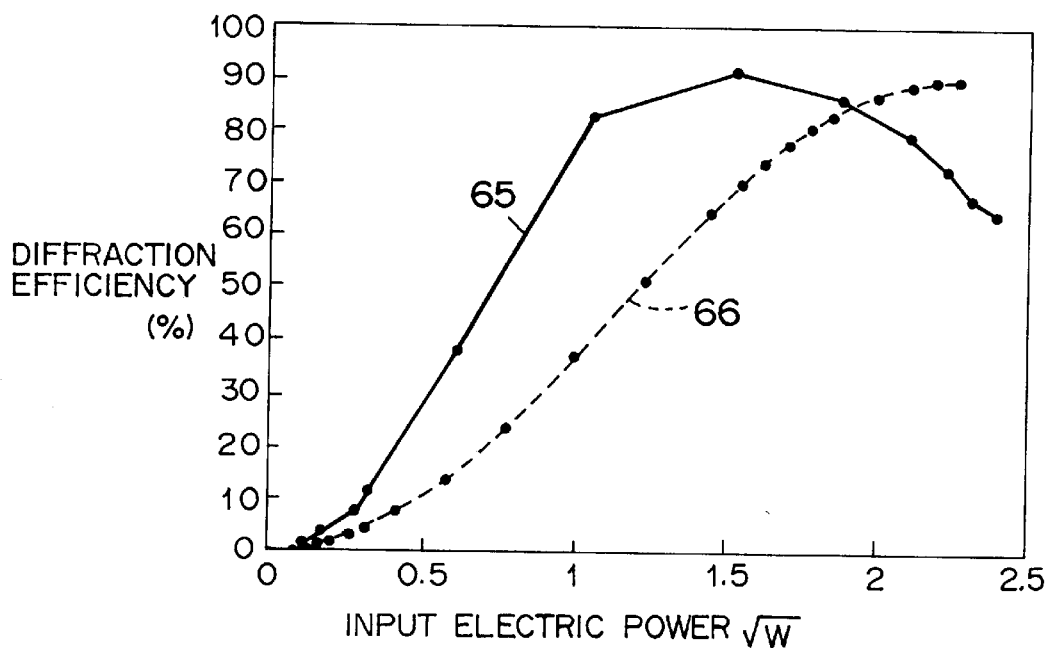
FIG. 13 is a graph which shows the relationship between the diffraction efficiency of the optical deflecting device and the electric power supplied to the optical deflecting device.

FIG. 13 is a graph showing the result of an experiment about the relationship between the power of the high-frequency electric signal applied to the transducer 45 of the optical deflector 41 and the diffraction efficiency (see the solid line 65). In the experiment, a He—Ne laser and a deflecting plate were used so that a light beam with a wavelength of 632.8 nm would progress in the waveguide layer 44 in a TEo mode. The intensity of diffracted light beam and the intensity of non-diffracted light beam were measured by a light power meter, and from the measured values, the diffraction efficiency was calculated. In FIG. 13, further, the result of an experiment on a conventional optical deflector using Rayleigh waves is shown for comparison (see the dotted line 66). As is apparent from FIG. 13, the optical deflecting device 41 attains a high diffraction efficiency even with small power.

As described above, in the optical deflecting device 41, since Sezawa waves which are the second mode of Rayleigh waves are used as surface acoustic waves, the surface acoustic waves can be excited with a large electromechanical coupling coefficient $k^2$, and a high diffraction efficiency can be attained with small power. Since only small power is applied, the durability of the transducer 45 is improved. Further, since generation of heat of the transducer 45 is small, a change of the refractive index of the waveguide layer 44 by the generation of heat is inhibited, and accordingly, the emergent angle and the intensity of the emergent light beam hardly change. Thus, the optical deflector 41 can deflect a guided light beam with a high accuracy. Moreover, since only small power is applied, the influence of electromagnetic waves outputted from the optical deflecting device 41 on the peripheral circuits, devices and human bodies can be inhibited, and only a simple electromagnetic shield is necessary. Consequently, the cost and the size of the optical deflecting device 41 are wholly reduced.

In the optical deflecting device 41, since Sezawa waves are used as surface acoustic waves, the electromechanical coupling coefficient is large, and only small electric power is required to obtain desired surface acoustic wave energy. Therefore, generation of heat of the optical deflecting device 41 can be inhibited. In such an optical deflecting device with thin film waveguide, a light beam directed from an external device is made incident to the thin film waveguide layer by a prism coupler or a grating coupler, and a deflected light beam is made emergent from the thin film waveguide layer by a coupler. If the temperature of the deflecting device is changeable, the refractive index of the waveguide layer and those of the couplers are changeable. Accordingly, the incident/emergent angle characteristics of the couplers change, and the coupling efficiency of the light beam changes, thereby lowering the usage efficiency of the light. Consequently, there are caused problems that the quantity of emergent light beam changes and that the scanning line is out of position with the change of the emergent angle of the emergent light beam. However, since the optical deflecting device 41 uses Sezawa waves, the temperature of the optical deflecting device 41 is not changeable. Thus, in the optical deflecting device 41, the usage efficiency of light beam is high, the quantity of the emergent light beam is fixed, and the scanning line is never out of position.

Also, since the propagation speed of Sezawa waves is much higher than that of Rayleigh waves, Sezawa waves can be used for high-speed light scanning. As generally known, the speed of Rayleigh waves which are propagated on a silicon substrate with a (001) surface as surface acoustic waves is approximately 3000 m/s, while the speed of Sezawa waves in the same situation is approximately 5200 m/s. With respect to an acousto-optic deflecting element like the present embodiment, variations in diffraction angle (deflection angle) is caused by variations in wavelength of surface acoustic waves generated by an interdigital transducer. For scanning of a guided light beam, surface acoustic waves with gradually varying wavelengths are used. The shorter the time which it takes the surface acoustic waves with gradually varying wavelengths to cross a guided light beam, at the higher speed the deflection angle of the guided light beam is varied, that is, the higher the scanning speed is. Therefore, the optical deflecting device 41 using Sezawa waves can be used for highspeed light scanning, and it is easier to employ the optical deflecting device 41 for a light beam scanning device of a laser display which must carry out high-speed scanning, an electrophotographic printer, a digital copying machine, etc. of which speed-up is demanded recently.

Figure 14:
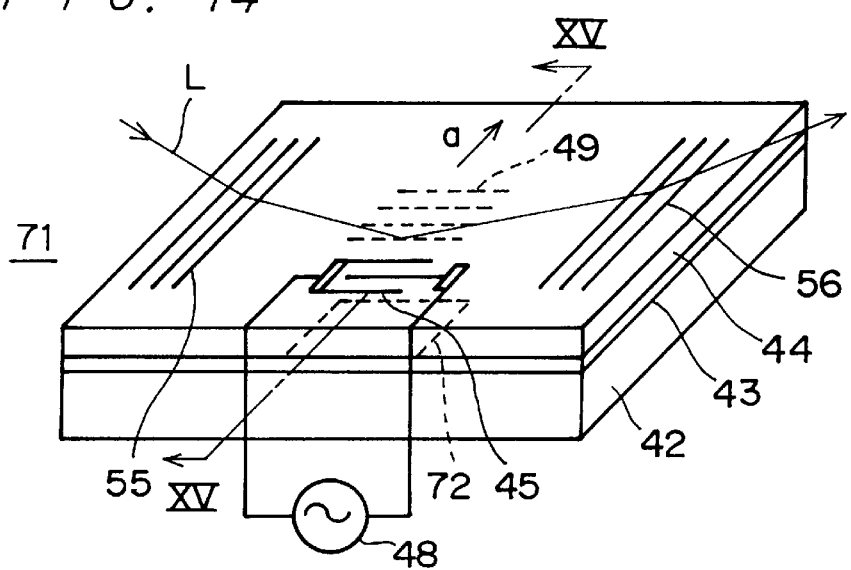
FIG. 14 is a perspective view of a modification of the optical deflecting device shown by FIG. 9.

FIG. 14 shows a modification of the optical deflecting device 41 shown in FIG. 9. The modified optical deflecting device 71 has the same structure as the optical deflecting device 41 except having a counter electrode 72.

Figure 15:
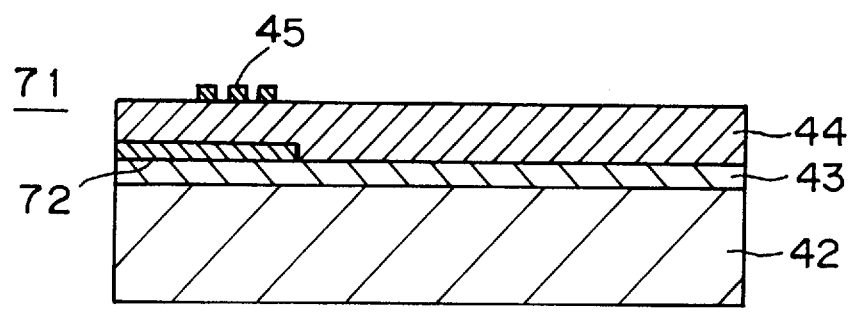
FIG. 15 is a sectional view of the modified optical deflecting device, taken along the line XV—XV in FIG. 14.

As FIGS. 14 and 15 show, the counter electrode 72 is located between the optical buffer layer 43 and the waveguide layer 44 and is opposite the transducer 45 with the waveguide layer 44 in-between. The counter electrode 72 is made of Al or the like and is formed by a photolithography method, a lift-off method, an etching method or the like.

Figure 16:
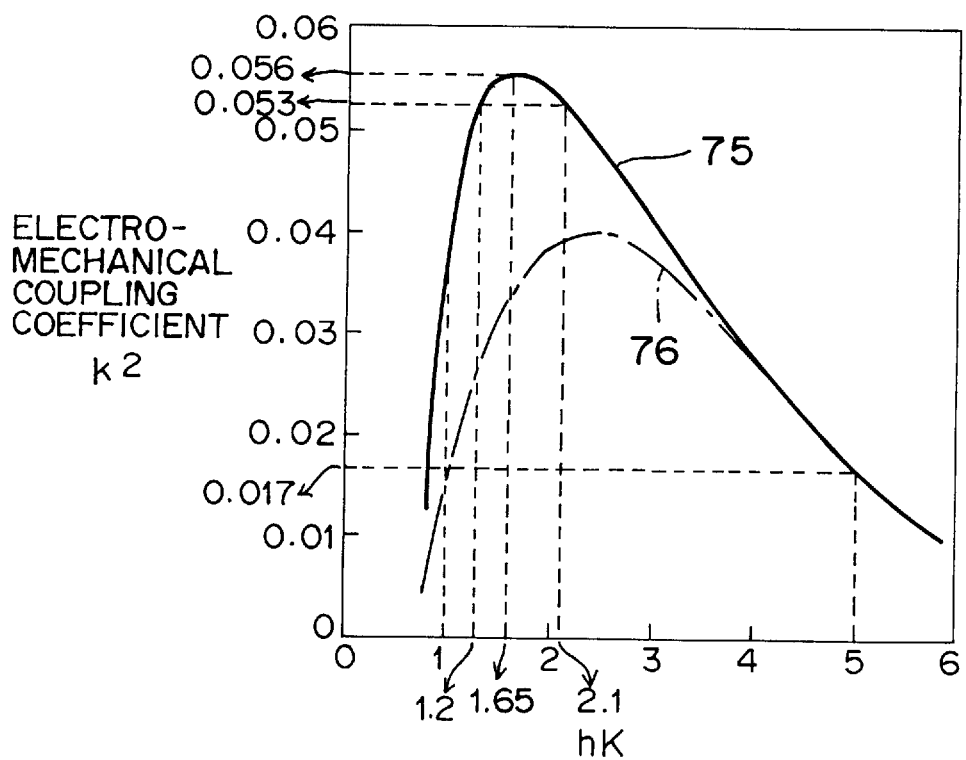
FIG. 16 is a graph which shows the relationship between the electromechanical coupling coefficient $k^2$ and the thickness of a ZnO thin film of the optical deflecting device shown by FIG. 14.

When a high-frequency signal is applied to the transducer 45, Sezawa waves which are the second mode of Rayleigh waves are excited as surface acoustic waves, and the Sezawa waves are propagated on the waveguide layer 44. As FIG. 16 shows, the electromechanical coupling coefficient $k^2$ in generating Sezawa waves becomes the maximum (approximately 0.056) when hK=1.65. According to FIG. 16, when the thickness h of the ZnO thin film 44 meets the following condition, Sezawa waves are excited with an electromechanical coupling coefficient $k^2$ not less than 0.017 (see the solid line 75).

$$1.0 < hK < 5.0$$

Although the electromechanical coupling coefficient $k^2$ is not less than 0.017 when hK=0.9, in this region, the change of the electromechanical coupling coefficient $k^2$ is rapid, and the electromechanical coupling coefficient $k^2$ changes largely with a small change of hK. Therefore, in consideration for stability, the range of hK which allows generation of Sezawa waves with an electromechanical coupling coefficient $k^2$ not less than 0.017 is set narrower. Also, Sezawa waves are excited with an electromechanical coupling coefficient $k^2$ not less than 0.053 when the thickness h of the ZnO thin film 44 meets the following condition.

$$1.2 < hK < 2.1$$

Thus, because of the counter electrode 72, the optical deflector 71 can attain a higher electromechanical coupling coefficient $k^2$ than the optical deflector 41 (see the alternate short and long dash line 76).

In the second embodiment, the guided light beam may be a $TM_1$ mode, a $TE_1$ mode, etc. as well as a $TM_o$ mode and a $TE_o$ mode. The piezoelectric waveguide layer does not have to be formed on the substrate to have a uniform thickness. For example, it is possible that the waveguide layer is so made to have a thickness of 3.2 $\mu$m in the region on which the transducer is provided and to have a thickness of 1.0 $\mu$m in the rest.

Figure 17:
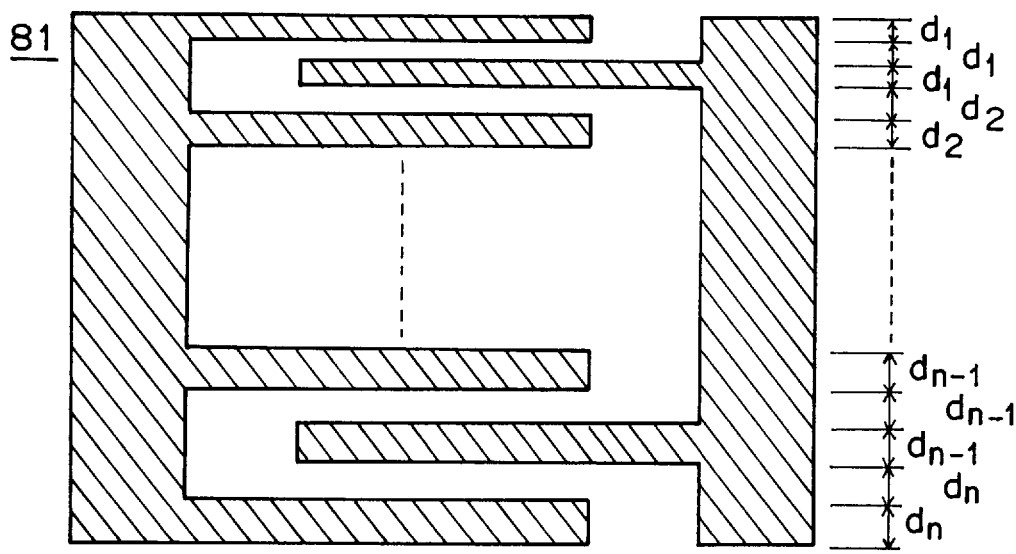
FIG. 17 is a plan view of a modification of a transducer shown in FIG. 10.

Also, the transducer does not have to be a normal interdigital transducer and may be a chirp interdigital transducer 81 shown in FIG. 17 which has finger electrodes of which widths and intervals are varied gradually ($d_1 < d_2 < \ldots < d_{n-1} < d_n$) to excite surface acoustic waves with a wide band from 4 $d_1$ to 4 $d_n$. The transducer 81 shown by FIG. 17 has n pairs of finger electrodes.

Figure 18:
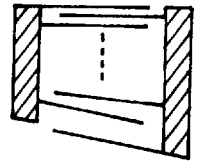
FIG. 18 is a plan view of another modification of the transducer shown in FIG. 10.
Figure 19:
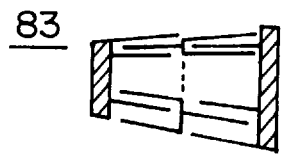
FIG. 19 is a plan view of another modification of the transducer shown in FIG. 10.
Figure 20:
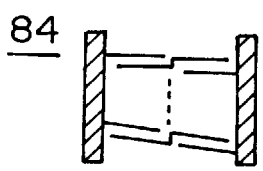
FIG. 20 is a plan view of another modification of the transducer shown in FIG. 10.
Figure 21:
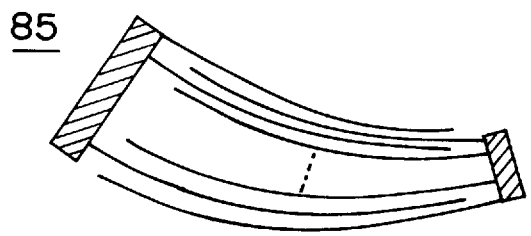
FIG. 21 is a plan view of another modification of the transducer shown in FIG. 10.

Further, the transducer may be a tilted finger chirp interdigital transducer 82 (shown by FIG. 18), 83 (shown by FIG. 19) or 84 (shown by FIG. 20), and a bent finger chirp interdigital transducer 85 shown by FIG. 21. In the interdigital transducers 83 and 84, a dogleg structure is adopted for impedance matching with an externally provided high-frequency signal generator. The dogleg structure is a structure which has stray electrodes among the finger electrodes. With respect to a high-frequency circuit, if the impedance of an input side does not match the impedance of a load, the circuit cannot oscillate efficiently. In each of the interdigital transducers 82 through 85, the finger electrodes extend at different angles so that the excited surface acoustic waves with various wavelengths will be propagated in different directions, and thereby, variations in Bragg angle which are caused by the variations of the surface acoustic waves in wavelength can be corrected. The finger electrodes of an interdigital transducer are not limited to a single type and may be a double type which can inhibit internal reflection and a type which excites surface acoustic waves propagated only in one way.

Figure 22:
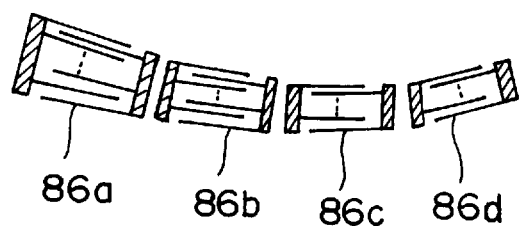
FIG. 22 is a plan view of another modification of the transducer shown in FIG. 10.

Furthermore, the transducer may be a tilted finger multiple interdigital transducer 86 shown by FIG. 22. In this case, surface acoustic waves are excited by four interdigital transducers 86a, 86b, 86c and 86d, and a guided light beam progressing in the waveguide layer acousto-optic interacts with the surface acoustic waves excited by each of the interdigital transducers 86a, 86b, 86c and 86d. In other words, multiple diffraction of the guided light beam is carried out. (More specifically, Bragg diffraction is carried out four times.) Multiple diffraction means to diffract a guided light beam a plurality of times, and by multiple diffraction, the range of deflection angle can be enlarged. Moreover, by multiple diffraction, cylindrical lens effects can be offset by each other. More specifically, when a guided light beam is diffracted using chirp waves (surface acoustic waves with gradually varied wavelengths), a collimated light beam is changed into a convergent or a divergent guided light beam (cylindrical lens effect). However, it is possible to carry out such diffraction twice to offset the cylindrical lens effects by each other.

In the second embodiment, a silicon substrate with a (001) surface is used, and surface acoustic waves which are propagated in the <110> direction of the silicon substrate are excited. However, a substrate with a different surface can be used, and the propagation direction of the surface acoustic waves can be made different. For example, it is possible to use a silicon substrate with a (111) surface and to excite surface acoustic waves which are propagated in the <11–2> direction of the silicon substrate. In this case, by designing the ZnO thin film acting as the waveguide layer to have a thickness h which meets hK=2.7, an electromechanical coupling coefficient $k^2$ of approximately 0.035 can be attained. Thus, the same effect as the second embodiment can be attained.

Figure 23:
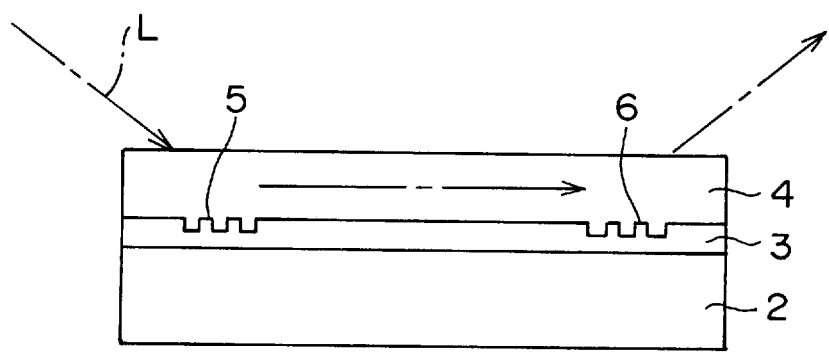
FIG. 23 is a plan view of a modification of an incidence grating and an emergence grating.

Prisms and the like can be used as the light incidence means and the light emergence means, and end surfaces of the waveguide layer can be made as a light incidence surface and a light emergence surface. Also, it is possible to provide a convergent lens section, a divergent lens section, a collimator lens section or the like in the waveguide layer. Further, as FIG. 23 shows, the light incidence grating 5 and the light emergence grating 6 can be provided at the interface between the waveguide layer 4 and the optical buffer layer 3 instead of on the surface of the waveguide layer 4.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A thin film optical waveguide comprising:

a substrate;

a waveguide layer which guides a light beam; and an optical buffer layer which is provided between the substrate and the waveguide layer, the optical buffer layer having a refractive index smaller than a refractive index of the waveguide layer and having a thickness such that the waveguide layer has a propagation loss of not more than 2 dB/cm for a zero mode guided light beam guided by the waveguide layer, and a propagation loss of not less than 4 dB/cm for a first mode guided light beam guided by the waveguide layer.

2. A thin film optical waveguide as claimed in claim 1, wherein:

the waveguide layer and the optical buffer layer are ZnO and $SiO_2$, respectively;

a guided light beam with a wavelength of 780 nm is guided by the waveguide layer; and the waveguide layer and the optical buffer layer have a thickness of $h_1$ μm and a thickness of $h_2$ μm, respectively, which meet the following conditions:

$h_2 \leq -0.035h_1 + 0.325 (\mu m)$ $h_2 \geq -0.050h_1 + 0.450 (\mu m)$ $h_1 \geq 0.300 (\mu m)$.

3. A thin film optical waveguide as claimed in claim 1, wherein:

the waveguide layer and the optical buffer layer are ZnO and $SiO_2$, respectively;

a guided light beam with a wavelength of 633 nm is guided by the waveguide layer; and the waveguide layer and the optical buffer layer have a thickness of $h_1$ μm and a thickness of $h_2$ μm, respectively, which meet the following conditions:

$h_2 \leq -0.050h_1 + 0.450 (\mu m)$ $h_2 \geq -0.025h_1 + 0.275 (\mu m)$ $h_1 \geq 0.300 (\mu m)$.

4. A thin film optical waveguide as claimed in claim 1, the waveguide layer and the optical buffer layer are ZnO and $SiO_2$, respectively;

a guided light beam with a wavelength of 400 nm is guided by the waveguide layer; and the waveguide layer and the optical buffer layer have a thickness of $h_1$ μm and a thickness of $h_2$ μm, respectively, which meet the following conditions:

$h_2 \leq -0.020h_1 + 0.18 (\mu m)$ $h_2 \geq -0.005h_1 + 0.17 (\mu m)$ $h_1 \geq 0.300 (\mu m)$.

5. An optical deflecting device comprising:

a substrate;

a piezoelectric waveguide layer which guides a light beam;

an optical buffer layer which is provided between the substrate arid the piezoelectric waveguide layer, the optical buffer layer having a refractive index smaller than a refractive index of the piezoelectric waveguide layer and having a thickness such that the waveguide layer has a propagation loss of not more than 2 dB/cm for a zero mode guided light beam guided by the waveguide layer, and a propagation loss of not less than 4 dB/cm for a first mode guided light beam guided by the waveguide layer;

light emergence means for making a light beam couple to the piezoelectric waveguide layer;

light emergence means for making a guided light beam progressing in the piezoelectric waveguide layer emergent therefrom; and generating means for generating surface acoustic waves which are propagated on the piezoelectric waveguide layer in such a direction as to cross the guided light beam progressing in the piezoelectric waveguide layer.

6. An optical deflecting device as claimed in claim 5, wherein each of the light incidence means and light emergence means is a grating which has bars at uniform intervals and is provided on a surface of the piezoelectric waveguide layer.

7. An optical deflecting device as claimed in claim 5, wherein each of the light incidence means and light emergence means is a grating which has bars at uniform intervals and is provided at an interface between the piezoelectric waveguide layer and the optical buffer layer.

8. An optical deflecting device as claimed in claim 5, wherein the generating means comprises an interdigital transducer which has a pair of interdigital electrodes provided on a surface of the piezoelectric waveguide layer and a high-frequency electric power source which supplies an alternating voltage to the pair of interdigital electrodes.

9. An optical deflecting device as claimed in claim 8, further comprising a conductor which is located opposite the pair of interdigital electrodes with the piezoelectric waveguide layer in-between.

10. An optical deflecting device comprising:

a substrate;

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom; and generating means for generating Sezawa waves as surface acoustic waves which are propagated on the piezoelectric waveguide layer in such a direction as to cross the guided light beam progressing in the piezoelectric waveguide layer.

11. An optical deflecting device as claimed in claim 10, wherein the substrate is a silicon substrate.

12. An optical deflecting device as claimed in claim 10, wherein the generating means comprises an interdigital transducer which has a pair of interdigital electrodes provided on a surface of the piezoelectric waveguide layer and a high-frequency electric power source which supplies an alternating voltage to the pair of interdigital electrodes.

13. An optical deflecting device as claimed in claim 12, further comprising a conductor which is located opposite the pair of interdigital electrodes with the piezoelectric waveguide layer in-between.

14. An optical deflecting device comprising:

a substrate;

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom;

generating means for generating Sezawa waves as surface acoustic waves which are propagated on the piezoelectric waveguide layer in such a direction as to cross the guided light beam progressing in the piezoelectric waveguide layer; and an optical buffer layer which is provided between the substrate and the piezoelectric waveguide layer and has a refractive index smaller than a refractive index of the piezoelectric waveguide layer.

15. An optical deflecting device comprising:

a substrate:

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom;

generating means for generating Sezawa waves as surface acoustic waves which are propagated on the piezoelectric waveguide layer in such a direction as to cross the guided light beam progressing in the piezoelectric waveguide layer; and, an optical buffer layer of a $SiO_2$ thin film which is provided between the substrate and the piezoelectric waveguide layer.

16. An optical deflecting device comprising:

a substrate;

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom; and generating means for generating Sezawa waves as surface acoustic waves which are propagated on the piezoelectric waveguide layer in such a direction as to cross the guided light beam progressing in the piezoelectric waveguide layer, wherein:

the piezoelectric waveguide layer is a ZnO thin film; and the following condition is fulfilled:

$$1.0 < hK < 5.0 (K = 2\pi/\Lambda)$$

wherein, h is a thickness of the ZnO thin film, and $\Lambda$ is wavelengths of the Sezawa waves.

17. An optical deflecting device comprising:

a substrate;

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom; and generating means for generating Sezawa waves as surface acoustic waves which are propagated on the piezoelectric waveguide layer in such a direction as to cross the guided light beam progressing in the piezoelectric waveguide layer, wherein:

the piezoelectric waveguide layer is a ZnO thin film; and the following condition is fulfilled:

$$2.0 < hK < 2.9 (K = 2\pi/\Lambda)$$

wherein, h is a thickness of the ZnO thin film, and $\Lambda$ is wavelengths of the Sezawa waves.

18. An optical deflecting device comprising:

a silicon substrate;

a piezoelectric waveguide layer which is provided on the substrate;

light incidence means for making a light beam couple to the piezoelectric waveguide layer;

light emergence means for making a guided light beam progressing in the piezoelectric waveguide layer emergent therefrom;

generating means for generating Sezawa waves as surface acoustic waves which are propagated on the piezoelectric waveguide layer in such a direction as to cross the guided light beam progressing in the piezoelectric waveguide layer; and an optical buffer layer of a $SiO_2$ thin film which is provided between the substrate and the piezoelectric waveguide layer.

19. A thin film optical waveguide comprising:

a substrate;

a waveguide layer which guides a light beam; and an optical buffer layer which is provided between the substrate and the waveguide layer, the optical buffer layer having a refractive index smaller than a refractive index of the waveguide layer wherein:

the waveguide layer and the optical buffer layer are ZnO and $SlO_2$, respectively;

a guided light beam with a wavelength of 780 nm is guided by the waveguide layer; and the waveguide layer and the optical buffer layer have a thickness of $h_1$ $\mu$m and a thickness of $h_2$ $\mu$m, respectively, which meet the following conditions:

$$h_2 \leq -0.035h_1 + 0.325 (\mu m)$$

$$h_2 \geq -0.050h_1 + 0.450 (\mu m)$$

$$h_1 \geq 0.300 (\mu m).$$

20. An optical deflecting device comprising:

a substrate;

a piezoelectric waveguide layer which guides a light beam;

an optical buffer layer which is provided between the substrate and the piezoelectric waveguide layer, the optical buffer layer having a refractive index smaller than a refractive index of the piezoelectric waveguide layer wherein:

the waveguide layer and the optical buffer layer are ZnO and $SiO_2$, respectively;

a guided light beam with a wavelength of 780 nm is guided by the waveguide layer; and the waveguide layer and the optical buffer layer have a thickness of $h_1$ μm and a thickness of $h_2$ μm, respectively, which meet the following conditions:

$h_2 \leq -0.035 h_1 + 0.325 (\mu m)$ $h_2 \geq -0.050 h_1 + 0.450 (\mu m)$ $h_1 \geq 0.300 (\mu m)$.

light incidence means for making a light beam couple to the piezoelectric waveguide layer;

light emergence means for making a guided light beam progressing in the piezoelectric waveguide layer emergent therefrom; and generating means for generating surface acoustic waves which are propagated on the piezoelectric waveguide layer in such a direction as to cross the guided light beam progressing in the piezoelectric waveguide layer.

* * * * *